United States Patent
van Peer et al.

(10) Patent No.: US 11,426,917 B2
(45) Date of Patent: Aug. 30, 2022

(54) MULTILAYER IDENTITY ARTICLE AND METHODS OF MAKING THE SAME

(71) Applicant: SABIC GLOBAL TECHNOLOGIES B.V., Bergen op Zoom (NL)

(72) Inventors: Cornelis Johannes Gerardus Maria van Peer, Halsteren (NL); Roy Martinus Adrianus l'Abee, Veldhoven (NL); Bart Eduard Kiekens, Bergen op Zoom (NL); Jordi Vink, Oude Tonge (NL); Pieter Jan Antoon Janssen, Rijsbergen (NL)

(73) Assignee: SABIC GLOBAL TECHNOLOGIES B.V, Bergen op Zoom (NL)

( * ) Notice: Subject to any disclaimer, the term of this patent is extended or adjusted under 35 U.S.C. 154(b) by 285 days.

(21) Appl. No.: 16/318,141

(22) PCT Filed: Jul. 21, 2017

(86) PCT No.: PCT/IB2017/054438
§ 371 (c)(1),
(2) Date: Jan. 16, 2019

(87) PCT Pub. No.: WO2018/015932
PCT Pub. Date: Jan. 25, 2018

(65) Prior Publication Data
US 2019/0240886 A1 Aug. 8, 2019

Related U.S. Application Data

(60) Provisional application No. 62/365,045, filed on Jul. 21, 2016.

(51) Int. Cl.
*B29C 48/21* (2019.01)
*B32B 27/08* (2006.01)
(Continued)

(52) U.S. Cl.
CPC .............. *B29C 48/21* (2019.02); *B29C 48/07* (2019.02); *B29C 48/08* (2019.02); *B29C 48/307* (2019.02);
(Continued)

(58) Field of Classification Search
None
See application file for complete search history.

(56) References Cited

U.S. PATENT DOCUMENTS

| 3,557,265 A | 1/1971 | Chisholm et al. |
| 3,576,707 A | 4/1971 | Schrenk et al. |

(Continued)

FOREIGN PATENT DOCUMENTS

| CN | 104063728 A | 9/2014 |
| GB | 2338680 A | 12/1999 |

(Continued)

OTHER PUBLICATIONS

Adhikar et al., "Structure and Properties of Multilayered PET/PC Composites," Macromol. Symp. 2010, 290, pp. 156-165.
(Continued)

*Primary Examiner* — Mohammad M Ameen
(74) *Attorney, Agent, or Firm* — Cantor Colburn LLP

(57) ABSTRACT

In one embodiment, a multilayer article can comprise: a multilayer substrate M, comprising: greater than or equal to 16 polymer A layers, preferably 16 to 512 polymer A layers; and greater than or equal to 16 polymer B layers, preferably 16 to 512 polymer B layers; wherein the polymer A layers and the polymer B layers are present in a ratio of 1:4 to 4:1, preferably the ratio is 1:1; a protective layer P; and an identification layer I between the protective layer P and the multilayer substrate M; wherein the identification layer I comprises information, and wherein the protective layer P prevents alteration thereof.

20 Claims, 5 Drawing Sheets

(51) Int. Cl.
*B32B 27/36* (2006.01)
*G06K 19/07* (2006.01)
*G06K 19/077* (2006.01)
*B29C 48/08* (2019.01)
*B29C 48/305* (2019.01)
*G06K 19/06* (2006.01)
*B42D 25/45* (2014.01)
*B29C 48/07* (2019.01)
*B29L 9/00* (2006.01)
*B29C 48/695* (2019.01)

(52) U.S. Cl.
CPC .............. *B32B 27/08* (2013.01); *B32B 27/36* (2013.01); *B32B 27/365* (2013.01); *B42D 25/45* (2014.10); *G06K 19/06037* (2013.01); *G06K 19/0723* (2013.01); *G06K 19/07722* (2013.01); *G06K 19/07773* (2013.01); *B29C 48/695* (2019.02); *B29L 2009/00* (2013.01); *B32B 2264/0285* (2013.01)

(56) References Cited

U.S. PATENT DOCUMENTS

| | | | |
|---|---|---|---|
| 4,426,344 A | 1/1984 | Dinter et al. | |
| 5,094,793 A * | 3/1992 | Schrenk | B29C 48/71 264/173.15 |
| 5,478,629 A * | 12/1995 | Norman | B32B 27/08 428/200 |
| 6,626,206 B1 | 9/2003 | Ulcei et al. | |
| 7,296,992 B2 | 11/2007 | Timmons et al. | |
| 9,067,451 B2 * | 6/2015 | Uyttendaele | B41M 5/267 |
| 2005/0029691 A1 | 2/2005 | Cloeren | |
| 2005/0084693 A1 * | 4/2005 | LaBrec | B32B 27/08 428/480 |
| 2005/0233150 A1 * | 10/2005 | Jing | B32B 27/322 428/421 |
| 2006/0251869 A1 | 11/2006 | Herslow | |
| 2007/0275219 A1 * | 11/2007 | Patel | C08F 210/16 428/219 |
| 2007/0298271 A1 * | 12/2007 | Liu | B29C 35/02 428/480 |
| 2008/0128493 A1 * | 6/2008 | Jones | B41M 5/24 235/380 |
| 2008/0138641 A1 * | 6/2008 | Leenders | B41M 5/0029 428/545 |
| 2008/0245865 A1 * | 10/2008 | Mosteller | B42D 25/00 235/457 |
| 2010/0276919 A1 | 11/2010 | Dietemann | |
| 2013/0170034 A1 * | 7/2013 | Merrill | G02B 5/32 359/486.01 |
| 2013/0261736 A1 | 10/2013 | Kleiner | |
| 2013/0323476 A1 * | 12/2013 | Farrell | B29C 66/306 428/195.1 |
| 2016/0245971 A1 * | 8/2016 | Chang | B29C 48/71 |
| 2017/0120663 A1 * | 5/2017 | Philippe | B42D 25/373 |

FOREIGN PATENT DOCUMENTS

| | | |
|---|---|---|
| JP | 2004175077 A | 6/2004 |
| JP | 2012247828 A | 12/2012 |
| WO | 0119612 A1 | 3/2001 |
| WO | 2014187825 A2 | 11/2014 |

OTHER PUBLICATIONS

International Search Report; International Application No. PCT/IB2017/054438; International Filing Date: Jul. 21, 2017; dated Oct. 25, 2017; 6 pages.
Tear Propagation Data Table; 1 Page (2016).
Written Opinion; International Application No. PCT/IB2017/054438; International Filing Date: Jul. 21, 2017; dated Oct. 25, 2017; 5 pages.

* cited by examiner

MULTILAYER IDENTITY ARTICLE AND METHODS OF MAKING THE SAME

CROSS REFERENCE TO RELATED APPLICATIONS

This application is a 371 of International Application No. PCT/M2017/054438, filed Jul. 21, 2017, which claims priority to U.S. Application Ser. No. 62/365,045, filed Jul. 21, 2016, which are incorporated herein by reference in their entirety.

BACKGROUND

Identification cards find use in a broad range of applications. For example, identification cards can take the form of driver's licenses, healthcare cards, transportation cards, banking cards, access cards, and international passports. A comprehensive list of identification card applications can be found in the International Organization for Standardization (ISO) and International Electrotechnical Commission (IEC) catalogue. For example, ISO/IEC 7810 is one of a series of standards describing the characteristics of identification cards. It is the purpose of ISO/IEC 7810 to provide criteria to which cards shall perform and to specify the requirements for such cards used for international interchange. It takes into consideration both human and machine aspects and states minimum requirements. The purpose of ISO/IEC 24789 and ISO/IEC 10373 is to provide guidance on methods that simulate and test a card's service life. National identification cards, more commonly known as passports, have the highest requirements regarding physical properties and service life. For example, national identification cards must exhibit a flex-life of 80,000 cycles.

Identity card production typically involves the use of polymers such as polyvinyl chloride (PVC) and polycarbonate (PC). The high flex-life standards for national identification cards and driver's licenses push the limits of what cards made from polycarbonate material can currently achieve. The ISO/IEC minimum flex-life standards are also expected to increase in the future. Such flex-life performance cannot be obtained by traditional blending of PC materials.

Identification cards normally comprise three functional layers or a multiple of these functional layers. For example, identification cards normally comprise a transparent outer laminate layer (typically 25 micrometers to 100 micrometers thick), a layer allowing laser engraving for personalization with pictures and text (25 micrometers to 100 micrometers), and a white core layer (200 micrometers to 500 micrometers). A card comprising a polycarbonate core struggles to meet high flex-life standard of 80,000 cycles. In addition, the further integration of printed images, safety features, and integrated circuit chips, increases the thickness of the identity card and significantly reduces flex-life. For example, a fully integrated identity card can have a flex-life lower than 10,000 cycles.

Thus, there is a strong need for identity article (e.g., cards) and methods of making the same that can provide excellent flex-life properties despite increased thickness and the presence of additional components such as integrated circuits.

SUMMARY

Described herein are methods for making multilayered substrates and articles comprising the multilayered substrates.

In one embodiment, a multilayer article can comprise: a multilayer substrate M, comprising: greater than or equal to 16 polymer A layers, preferably 16 to 512 polymer A layers; and greater than or equal to 16 polymer B layers, preferably 16 to 512 polymer B layers; wherein the polymer A layers and the polymer B layers are present in a ratio of 1:4 to 4:1, preferably the ratio is 1:1; a protective layer P; and an identification layer I between the protective layer P and the multilayer substrate M; wherein the identification layer I comprises information, and wherein the protective layer P prevents alteration thereof.

In an embodiment, a method of making a multilayer identity article can comprise: forming a multilayer substrate M, wherein the multilayer substrate M is formed by: co-extruding two or more feed streams in an overlapping manner forming a composite layer stream, wherein the feed streams comprise an polymer A stream and a polymer B stream, wherein polymer A has a different composition than polymer B; processing the composite layer stream in an extrusion cycle comprising: splitting the composite layer stream into sub-streams, wherein each of the sub-streams has a portion of each layer of the composite layer stream; repositioning the sub-streams in an overlapping manner such that the sub-streams are aligned with one another; and contacting the sub-streams with each other to form a subsequent composite layer stream; repeating the extrusion cycle until a total number of substrate layers is achieved, wherein the total number of substrate layers is represented by $X(Y^N)$, wherein X represents the number of feed streams, Y represents the number of sub-streams, and N represents a number of times the extrusion cycle is repeated; and disposing an identification layer I between a protective layer P and the multilayer substrate, wherein the identification layer I comprises information, and wherein the protective layer P prevents alteration thereof.

In an embodiment a multilayer article, comprising a core layer comprising a first material; a first outer layer located on a first side of the core layer, wherein the first outer layer comprises a second material; and a second outer layer located on a second side of the core layer opposite the first side, wherein the second outer layer comprises a second material; wherein the first material and the second material comprise a polymer independently selected from polycarbonate and polyester; preferably the first material comprises polybutylene terephthalate and the second material comprises polycarbonate.

These and other features and characteristics are more particularly described below.

BRIEF DESCRIPTION OF THE DRAWINGS

The following is a brief description of the drawings wherein like elements are numbered alike and which are presented for the purposes of illustrating the exemplary embodiments disclosed herein and not for the purposes of limiting the same.

DETAILED DESCRIPTION

Figure 1:
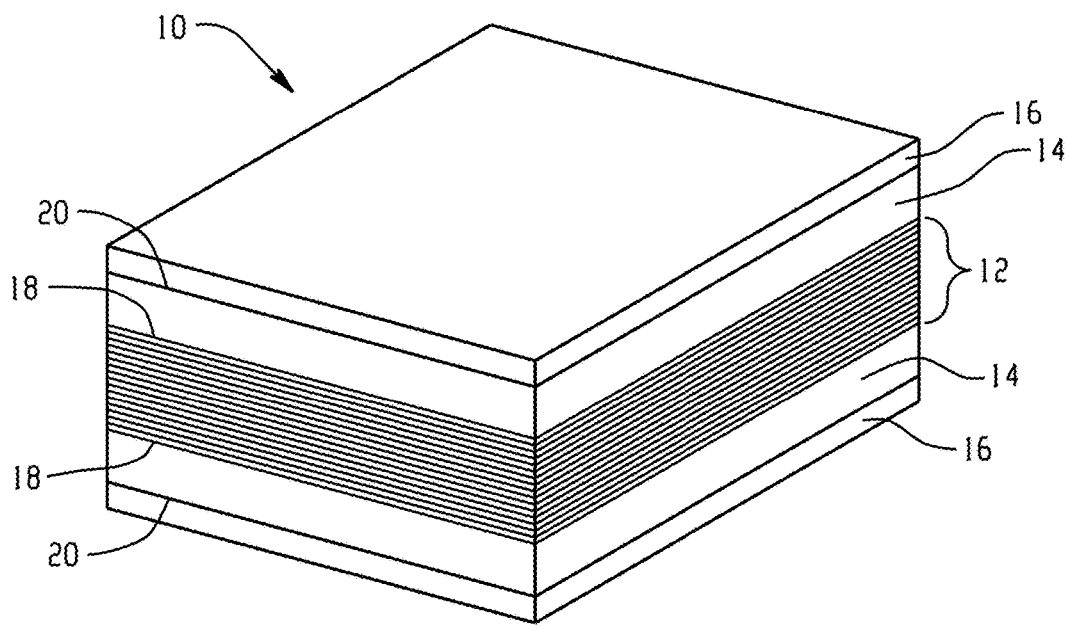
FIG. 1 is a simplified schematic diagram representing a multilayer identity card.

The identity cards and methods of making the same disclosed herein can provide excellent flex-life properties despite increased thickness and the presence of additional components such as integrated circuits. For example, the identity cards disclosed herein can have a flex-life of greater than or equal to 400,000 cycles, e.g., greater than or equal to 450,000, greater than or equal to 500,000 cycles, and even greater than or equal to 550,000 cycles. The identity cards disclosed herein can achieve this greatly improved flex-life despite thicknesses of greater than or equal to 500 micrometers (μm), and even greater than or equal to 800 μm (e.g., 1,000 μm), lamination of additional layers, and integration of circuit chips and other functional components.

The method disclosed herein for making a multilayer substrate can include coextruding two or more feed streams in an overlapping manner to form a composite layer stream, e.g., feed streams comprising at least two different polymers, optionally 2-6 polymers, or 2-4 polymers. The feed streams can be coextruded using an extrusion cycle comprising splitting the composite layer stream into two or more sub-streams which can then be repositioned in an overlapping manner, followed by contacting the sub-streams (e.g., lamination). For example, contacting can comprise lamination. The extrusion cycle can be repeated until a total number of desired substrate layers is achieved. The total number of substrate layers can be represented by the formula $X(Y^N)$, wherein X represents the number of feed streams, Y represents the number of sub-streams, and N represents a number of times the extrusion cycle is repeated. For example, the extrusion cycle can produce a multilayer substrate with polymer A layers and polymer B layers that overlap in an alternating manner and are present in a 1:4 to 4:1 ratio, preferably a 1:1 ratio. Such substrates can be formed using the layer multiplication technology and equipment commercially available from Nordson Extrusion Dies Industries LLC, Chippewa Falls, Wis.

The polymer A stream can comprise polycarbonate, polyimide (e.g. polyamideimide, polyetherimide, and so forth), polyarylate, polysulphone (e.g., polyethersulphone), poly alkyl methacrylate (e.g., polymethylmethacrylate, polybutyl methacrylate, and so forth), polyvinylidene fluoride, polyvinylchloride, acrylonitrile butadiene styrene polymers (ABS), acrylic-styrene-acrylonitrile polymers (ASA), acrylonitrile-ethylene-propylene-diene-styrene polymers (A-EPDM), polystyrene, polyphenylene sulfide, polyurethane, polyphenylene ether, or a combination comprising at least one of the foregoing. For example, the polymer A stream can comprise polycarbonate, polyetherimide, polysulphone, polymethylmethacrylate, polyvinylchloride, polyurethane, polyphenylene ether, or a combination comprising at least one of the foregoing, e.g., can comprise polycarbonate. For example, polymer A can be a polycarbonate copolymer such as polycarbonate-siloxane block copolymers (such as LEXAN™ EXL Resin). Another possible copolymer is polycarbonate and iso- and terephthalate esters of resorcinol (ITR) (such as LEXAN™ SLX Resin). Another possible copolymer is polycarbonate and sebacic acid (such as LEXAN™ HFD Resin).

The polymer B stream has a different composition than the polymer A stream. The polymer B stream can comprise polyester (polybutylene terephthalate, polyethylene terephthalate, and so forth), polyvinylidene fluoride, polyaryletherketone ("PAEK"; e.g., polyether ether ketone (PEEK)), polytetrafluoroethylene, polyamide (e.g., polyamide 6,6, polyamide 11), polyphenylene sulphide, polyoxymethylene, polyolefin (e.g., polypropylene, polyethylene), polyurethane, or a combination comprising at least one of the foregoing. For example, polymer B can comprise polyester, preferably at least one of polybutylene terephthalate and polyethylene terephthalate, and more preferably polyethylene terephthalate.

The method disclosed herein for making a multilayer substrate can include contacting two or more feed streams in an overlapping manner forming a composite layer stream, e.g., within a feed block of a co-extrusion apparatus. The two or more feed streams can be overlaid vertically to form a composite layer stream. The composite layer stream can remain un-blended wherein the polymer A stream and the polymer B stream remain distinguishable within the composite layer stream.

The multilayer substrate can also be formed using an extrusion feedblock that enables multilayer arrangements. For example, extrusion feedblocks such as those commercially available from Cloeren Inc, Orange Tex.

Once the composite layer stream is formed, it can be processed in an extrusion cycle comprising splitting the composite layer stream into two or more sub-streams. For example, the composite layer stream can be split vertically into two or more diverging sub-streams, wherein each sub-stream comprises at least a portion of each original feed stream. In other words, each sub-stream comprises a portion of all of the layers of the composite layer stream. The sub-streams can then be repositioned in an overlapping manner. For example, each sub-stream can travel through its own divergent channel within a co-extrusion apparatus which direct the sub-streams to an overlaid position (e.g., a vertically overlaid position) where the sub-streams contact one another to form a subsequent composite layer stream comprising both of the sub-streams aligned (e.g., vertically). (See FIG. 3) The extrusion cycle combines the two or more sub-streams. For example, the sub-streams are released from the vertically overlaid channels, thus contacting each other in an overlapping manner. The extrusion cycle can be repeated until a multilayer substrate having the desired number of layers is achieved. Once the multilayer substrate formation is complete, a skin layer can be applied to one or both sides of the substrate. Examples of such co-extrusion processes, systems, and techniques are disclosed in U.S. Pat. No. 4,426,344 to Dinter et al., U.S. Pat. No. 5,094,793 to Schrenk et al., and U.S. Publication No. 2005/0029691.

The total number of substrate layers can be represented by the formula $X(Y^N)$, wherein X represents the number of feed streams, Y represents the number of sub-streams, and N represents a number of times the extrusion cycle is repeated. For example, the extrusion cycle can produce a multilayer substrate with polymer A layers and polymer B layers that are distinguishable and overlap in an alternating manner.

The polymer A layers and the polymer B layer can be present within the multilayer substrate in a certain ratio. For example, polymer A layers and polymer B layers can be present in a ratio of 1:4 to 4:1, e.g., a ratio of 1:1, 1:3, or 3:1 ratio. The multilayer substrate can comprise a total number of layers of greater than or equal to 4 layers, for example, the total number of layers can be greater than or equal to 30 layers, greater than or equal to 64 layers, greater than or equal to 250 layers, and even greater than or equal to 512 layers. The total number of layers can be 32 to 1024 layers, or 64 to 512 layers.

Optionally, the polymer A layers can comprise additive(s) such as stabilizer(s), colorants, dyes, and so forth, with the proviso that the additive(s) are selected so as to not significantly adversely affect the desired properties of the composition. Polymer A layer can comprise additive(s) that undergo photo-chemical rearrangements to produce areas which interact with light differently (either visible light or non-visible light, e.g., UV active fluorescence) than the un-treated background, thereby forming a mark (text, logo, barcode, image, or the like). The additive can be a photo-active additive or colorant, which in certain media may be regarded as photochromic. For example, the polymer A layer can comprise less than or equal to 5 wt % whitening agent (e.g., titanium dioxide), e.g., 0.05 to 4 wt %, or 0.1 to 3 wt %, based upon a total weight of the polymer A layer. For example, the layer can comprise a laser marking additive that will form a mark when exposed to a laser. The type of laser marking additive and the type of laser are dependent upon the applicant and the desired mark.

Optionally, the polymer B layers can comprise additive(s) such as stabilizer(s), colorants, dyes, and so forth, with the proviso that the additive(s) are selected so as to not significantly adversely affect the desired properties of the composition. Polymer B layer can comprise additive(s) that undergo photo-chemical rearrangements to produce areas which interact with light differently (either visible light or non-visible light, e.g., UV active fluorescence) than the un-treated background, thereby forming a mark (text, logo, barcode, image, or the like). The additive can be a photo-active additive or colorant, which in certain media may be regarded as photochromic. For example, the polymer B layer can comprise less than or equal to 5 wt % whitening agent (e.g., titanium dioxide), e.g., 0.05 to 4 wt %, or 0.1 to 3 wt %, based upon a total weight of the polymer B layer.

Some possible additives that can be employed in one or more of polymer A layer or polymer B layer include hydroxybenzophenones, hydroxybenzotriazoles, hydroxybenzotriazines, cyanoacrylates, oxanilides, benzoxazinones, benzylidene malonates, hindered amine light stabilizers, nano-scale inorganics, and combinations comprising at least one of the foregoing. Other examples of additives can include members of the spiropyran, spirooxazine, fulgide, diarylethene, spirodihydroindolizine, azo-compounds, and Schiff base, benzo- and naphthopyrans families, and combinations comprising at least one of the foregoing. Other possible additives include taggants, e.g., phosphors such as yttrium oxysulfide (europium-doped yttrium oxysulfide) and/or a nitride taggant material. For example, nitride material that is optionally doped with cerium and/or europium, a nitrido silicate, a nitride orthosilicate, an oxonitridoaluminosilicate, or a combination comprising at least one of the foregoing.

The multilayer substrate can have a total thickness upon the application and requirements thereof. For example, the total thickness can be greater than or equal to 4 micrometers e.g., greater than or equal to 64 micrometers, such as 200 micrometers to 4,000 micrometers, 200 to 1,500 micrometers, or 250 to 550 micrometers. The total thickness of the multilayer substrate can be less than or equal to 1,000 micrometers, or could even be greater than 1,000 micrometers.

The thickness of an individual layer within the multilayer substrate can be less than or equal to 15 micrometers, e.g., 0.1 to 10 micrometers, or 0.5 to 5 micrometers, or even 0.8 to 3 micrometers. It is noted that the thickness of the polymer A layer can be the same as the thickness of the polymer B layer. Alternatively, the thickness of the polymer A layer can be different than the thickness of the polymer B layer.

The multilayer substrate disclosed herein can have a flex-life of greater than or equal to 400,000 cycles, for example, greater than or equal to 500,000 cycles, even greater than or equal to 700,000 cycles. As used herein, flex-life cycles were determined according the standards found in ISO/IEC 24789-2:2011.

The identity articles that use the multilayer substrate(s) can comprise the multilayer substrate(s), identification layer(s) (also referred to as information display layer(s)), functional layer(s), and protective layer(s), as well as combinations comprising at least one of these layers. For example, the card can comprise a protective layer (e.g., protective layer P) on one side of a substrate (e.g., substrate A), with an identification layer (e.g., ID layer A) therebetween. Optionally, on the other side of the substrate A (i.e., the opposite side), can be another protective layer (e.g., protective layer PP). Optionally, between the protective layer PP and the substrate A can be another identification layer (e.g., ID layer B). Optionally between the ID layer B and the substrate A can be another substrate (substrate B) and/or a functional layer. The functional layer can be located between substrate A and substrate B.

The identification layer (also referred to as layer I) can be any layer carrying information of the identity article, such as text (e.g., names, security codes, logos, and the like), photographs, holographic images, patterns, signatures, or a combination comprising at least one of the foregoing. The identification layer can be a laser-engravable layer. The identification layer can be a photoactive layer and/or can comprise a taggant. The identification layer can have a thickness of less than or equal to 50 micrometers, e.g., 5 to 25 micrometers, or 5 to 15 micrometers. The identification layer can comprise various materials such as a thermoplastic material. For example, the identification layer can comprise material such as those identified for use in the polymer A stream, e.g., a thermoplastic material. The identification layer can comprise polycarbonate, such as a combination comprising polycarbonate.

The protective layer (also referred to as layer P) can be any layer that provides protection to the identification layer, e.g., protection from alternation of the information in the identification layer, protection of the materials of any of the layers (such as UV protection), as well as combinations comprising at least one of the foregoing. The protective layer can be a layer having a sufficient transparency to allow viewing of information in the identification layer. The protective layer can have a percent transmission of greater than or equal to 75%, for example, greater than or equal to 85%, and even greater than or equal to 90%, or greater than or equal to 95%. As use herein transmission is measured in accordance with ASTM D-1003-00, Procedure A, measured, e.g., using a HAZE-GUARD DUAL from BYK-Gardner, using and integrating sphere (0°/diffuse geometry), wherein the spectral sensitivity conforms to the International Commission on Illumination (CIE) standard spectral value under standard lamp D65. Possible materials that can be used for the protective layer include those identified for use in the polymer A stream, e.g., a thermoplastic material. The protective layer can comprise polycarbonate, such as a combination comprising polycarbonate.

The protection layer and/or the identification layer can be applied to the multilayer substrate using various processes such as lamination, bonding, coating, and so forth.

Optionally, the identification article can comprise functional layer(s). The functional layer can comprise circuit(s), chip(s), and printed layer(s). For example, the functional layer can comprise a radio frequency identification (RFID) tag. The functional layer can, alternatively or in addition, comprise an integrated circuit. In an identity article, for example, the functional layer can be near the center of the card. Optionally, it can have a thickness of 400 to 600 micrometers.

The method disclosed herein for making a multilayer identity article can include applying additional layers to the multilayer substrate such that the identification layer is located between a substrate and a protective layer. The functional layer can optionally be located between two multilayer substrates. If desired, a second identification layer can be located on a second side of the substrate, between the substrate and a second protective layer. These layers can be adhered together using lamination, adhesive, or a combination comprising at least one of the foregoing. For example, the various layers can be laminated together.

The multilayer identity articles disclosed herein can find use in a broad range of applications. For example, identification articles can take the form of driver's licenses, healthcare cards, transportation cards, banking cards, access cards, passports, badges, or a combination comprising at least one of the foregoing, as well as any other identified in the ISO and/or IEC catalogues.

Optionally, the multilayer substrate can form a portion of an article. Due to its long flex life (e.g., greater than 500,000 flex cycles), the multilayer substrate can be employed in many different applications beyond identity articles. For example, the multilayer substrate can function as a hinge in an article.

A more complete understanding of the components, processes, and apparatuses disclosed herein can be obtained by reference to the accompanying drawings. These figures (also referred to herein as "FIG.") are merely schematic representations based on convenience and the ease of demonstrating the present disclosure, and are, therefore, not intended to indicate relative size and dimensions of the devices or components thereof and/or to define or limit the scope of the exemplary embodiments. Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

Referring now to FIG. 1, the multilayer identity card 10 disclosed herein can comprise a multilayer substrate 12. An information layer 14 can be located between the substrate 12 and a protection layer (transparent layer 16). For example, the information layer 14 can be located on a surface 18 of the multilayer substrate 12, while the transparent layer 16 can be located on a surface 20 of the information display layer 14.

Figure 2:
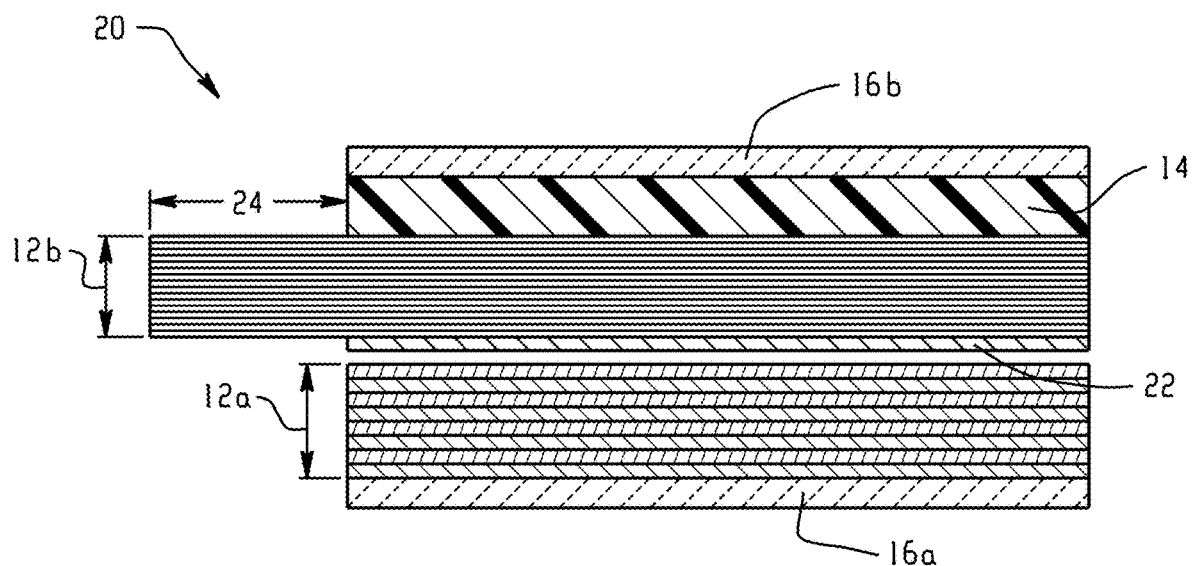
FIG. 2 is a cross-sectional view of simplified schematic diagram representing an article comprising a multilayer substrate than comprise a portion that can be used as a hinge.
Figure 6:
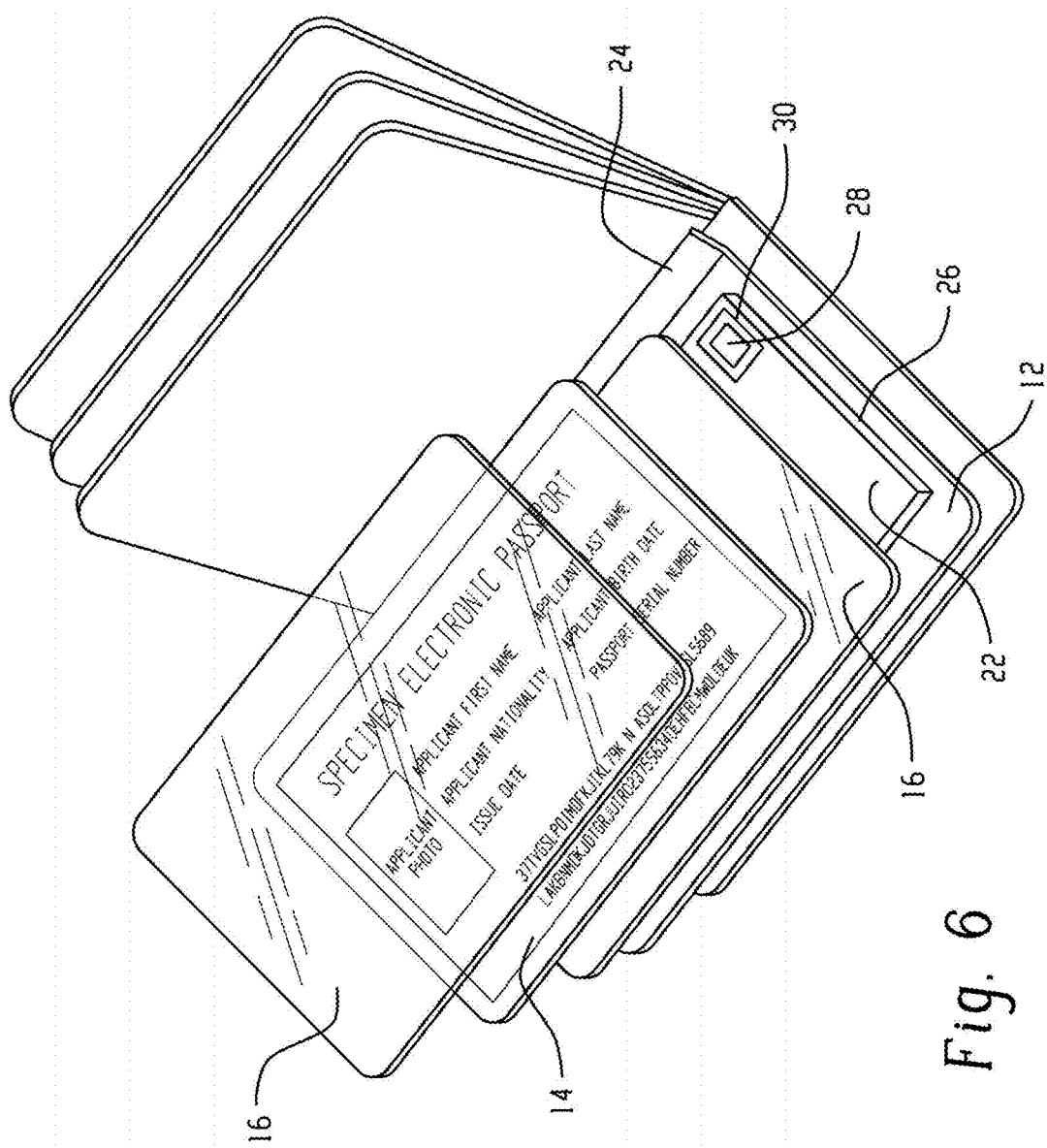
FIG. 6 is a perspective view of an identity article comprising a multilayer substrate.

FIG. 2 illustrates a cross sectional view of an identity article 20 comprising multilayer substrates 12, information layer 14, functional layer 22, and transparent layers 16. Herein the multilayer substrate can extend beyond the other layers (area 24). Here, the area 24 can be used as a hinge. For example, the article 20 can be the information page of an identification article (e.g., a passport), and the area 24 can be connected to the other portion of the article (e.g., connected to the other pages of the passport). Optionally, the functional layer 22 can comprise one or more of an antenna 26, and an integrated circuit 28, and a contactless module 30. (See FIG. 6)

In this embodiment, although a single information layer 14 is illustrated, multiple information layers are possible. For example a second information layer can be located between the multilayer substrate 12a and the transparent layer 16a. The functional layer is located between the multilayer substrates 12a and 12b. However, a single substrate can be employed.

Figure 3:
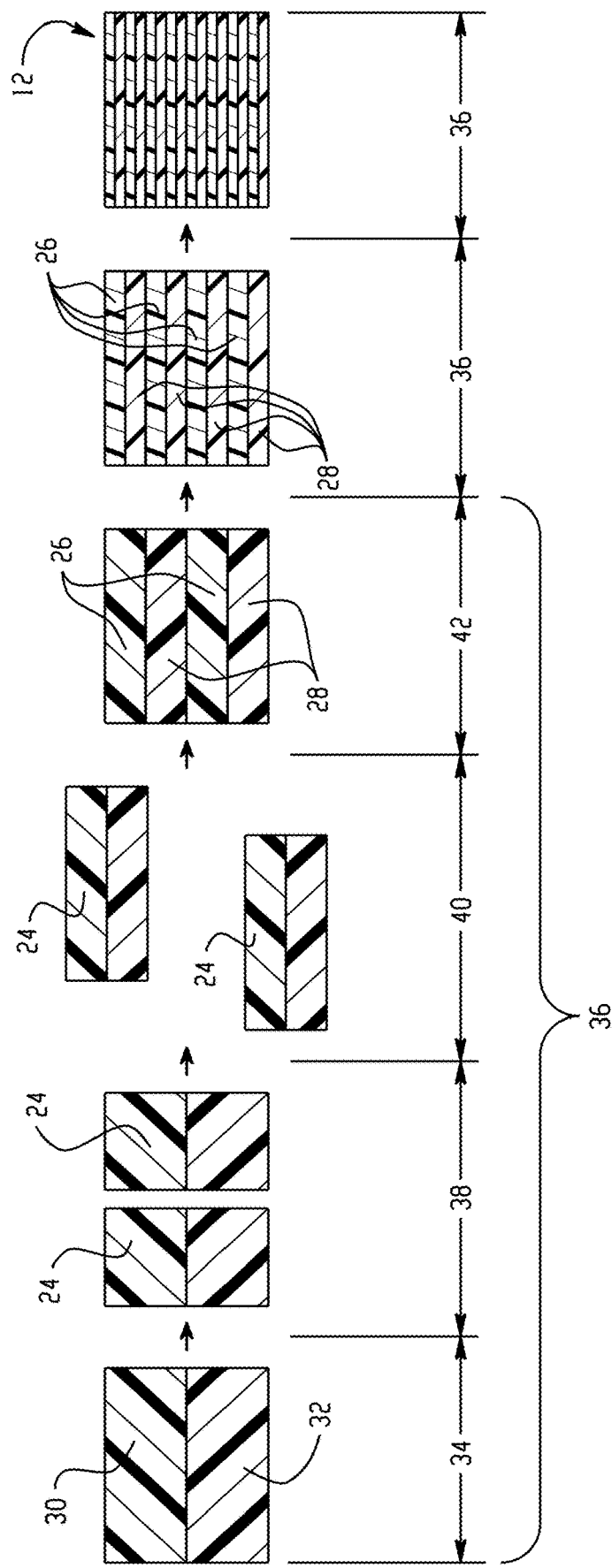
FIG. 3 is a simplified schematic diagram representing a method of making a multilayer substrate.

Referring now to FIG. 3, the method of making a multilayer substrate 12 is illustrated. In this method, two or more feed streams (30,32) are contacted in an overlapping manner to form a composite layer stream 34. For example, FIG. 3 depicts two feed streams, polymer A stream 30 and polymer B stream 32, which can be contacted in an overlapping manner to form the composite layer stream 34. The two or more feed streams can be simultaneously extruded. Then, in extrusion cycle 36, the composite layer stream 34 is split 38 into two or more sub-streams 24 which are repositioned 40 in an overlapping manner, and recombined to form a single stream 42. The splitting and repositioning is repeated in as many further extrusion cycles 36 as desired until a desired total number of substrate layers is achieved.

The total number of substrate layers can be represented by the formula $X(Y^N)$, wherein X represents the number of feed streams, Y represents the number of sub-streams, and N represents a number of times the extrusion cycle is repeated. For example, FIG. 3 depicts two feed streams 30 and 32, two sub-streams 24, three extrusion cycles 36, and a final multilayer substrate 12 with 16 total layers. For example, FIG. 3 depicts polymer A layers 26 and polymer B layer 28 that overlap in an alternating manner and are present in a 1:1 ratio.

The following examples are merely illustrative of the multilayer identity articles disclosed herein and are not intended to limit the scope hereof.

EXAMPLES

TABLE 1

Material Description

| Component | Description | Source |
|---|---|---|
| $PC_1$ | Polycarbonate resin ($M_w$ = 18,000 g/mol, PS standards) (LEXAN ™ Resin OQ1026) | SABIC |
| $PC_2$ | Polycarbonate resin ($M_w$ = 21,800 g/mol, PS standards) (LEXAN ™ Resin HF1110) | SABIC |
| PBT | Polybutylene terephthalate resin ($M_w$ = 111,000 g/mol, PS standards) (VALOX ™ 315) | SABIC |
| PET | Polyethylene terephthalate resin (ARNITE ™ A02 307 PET) | DSM |
| Phosphoric Acid | $H_3O_4P$ ($M_w$ = 98 g/mol, PS standards) | |
| Ruthenium Tetroxide | $RuO_4$ ($M_w$ = 165.07 g/mol, PS standards) | |

PS = polystyrene

Example 1

Comparative samples 1-3 were prepared by conventional methods. $PC_1$ and PBT were separately compounded at 260° C., 300 rotations per minute (rpm), 15 kilograms per hour (kg/hr) throughput, and a torque of 42%. Subsequently, these pre-made blends were extruded into 500 micrometer thick film on a Dr. Collin film extrusion apparatus. A chill-roll setup was used at a temperature of 60° C. to collect the extruded films. 0.05 weight percent (wt. %) phosphoric acid was added during the compounding step to prevent potential resin degradation. Sample 3 was further press-polished to reduce surface roughness. A description of the materials used is provided in Table 1. Fatigue tests were conducted on the resulting monolayer extruded films according to the testing methods described in ISO/IEC 10373-1:2006 and ISO/IEC 10373-2:2006. Flex-life cycles were determined according the standards found in ISO/IEC 24789-2:2011. The results are provided in Table 2.

Samples 4-7 were prepared wherein the layers were split and repositioned until the desired number of layers was attained. The multi-layered sheets were prepared by simultaneous co-extrusion. A total of 5 or 8 extrusion cycles (N) were used to obtain respectively 64 or 512 alternating layers. A 25 centimeter (cm) wide die system with a varying gage was used to prepare 250 to 500 micrometer thick films. Samples 4 and 7 were prepared with a 1:1 ratio of $PC_1$ layers to PBT layer. Samples 5 and 6 were prepared using a 1:3 ratio and a 3:1 ratio respectively. A chill-roll setup at a temperature of 60° C. was used to collect the extruded films. Fatigue tests were conducted on the resulting extruded films according to the testing methods described in ISO/IEC 10373-1:2006 and ISO/IEC 10373-2:2006. Flex-life cycles were determined according the standards found in ISO/IEC 24789-2:2011. The results are provided in Table 2.

TABLE 2

| Sample | Description | Thickness (micrometers) | Flex-life Cycles |
|---|---|---|---|
| 1 | Monolayer $PC_1$ | 290 | 150,000 |
| 2 | Monolayer $PC_1$ | 546 | <10,000 |
| 3 | Monolayer $PC_1$ (press-polished) | 500 | <10,000 |
| 4 | 64 multilayer 1:1 $PC_1$/PBT | 249 | DNF* |
| 5 | 64 multilayer 1:3 $PC_1$/PBT | 257 | DNF* |
| 6 | 64 multilayer 3:1 $PC_1$/PBT | 283 | DNF* |
| 7 | 512 multilayer 1:1 $PC_1$/PBT | 500 | DNF* |

*DNF is did not fail; tested for 1 million flex-life cycles.

Table 2 demonstrates the unique performance and unexpected advantages of $PC_1$/PBT multilayer systems (Samples 4-7) as compared to the conventional $PC_1$ monolayer systems (Samples 1 to 3). For example, it is commonly known that flex-life improves when sample thickness is reduced. This is evident when comparing Sample 1 to Samples 2 and 3. This comparison shows a significant reduction in flex-life due to increased thickness from less than 300 micrometers to greater than 500 micrometers. Sample 3 demonstrates that surface roughness does not influence flex-life significantly, as the flex-life remained low (less than 10,000 cycles) after press-polishing. Samples 4 to 7 however, unexpectedly show that the flex-life of the multilayer systems was dramatically increased to greater than 200,000 cycles, even at a film thickness of 500 micrometers. It is noted that tests were stopped after 250,000 cycles for Samples 4-6 and after 200,000 cycles for Sample 7 as no indication of failure was observed whatsoever.

Example 3

For the purposes of this example, two extruded films were subsequently laminated together, thus doubling their thickness. For example, Sample 8 was prepared by laminating two of the multilayer Sample 7 extruded films together. Sample 10 was prepared by laminating two monolayer Sample 9 extruded films together for comparative purposes. The samples were laminated in a Lauffer 40-70/2 lamination press using a default lamination method. The press was preheated to 200° C. and sheets were inserted into the press. The press was held for 20 minutes at 200° C. and 90 Newton per centimeter square ($N/cm^2$). The press was then cooled down to 20° C. and 205 $N/cm^2$. The total process time was approximately 40 minutes. After the samples were laminated, they were die cut into the shape of an identity card according to the standard presented in ISO/IEC 7810:2003. An Oasys OMP 100 punch unit was used. Fatigue tests were conducted on the resulting cards according to the testing methods described in ISO/IEC 10373-1:2006 and ISO/IEC 10373-2:2006. Hex-life cycles were determined according the standards found in ISO/IEC 24789-2:2011. The results are provided in Table 3.

TABLE 3

| Sample | Description | Thickness (micrometers) | Flex-life Cycles |
|---|---|---|---|
| 7 | 512 multilayer 1:1 $PC_1$/PBT | 500 | DNF* |
| 8 | 2 × (512 multilayer 1:1 $PC_1$/PBT) | 1000 | 200,000 |
| 9 | Monolayer 1:1 $PC_1$/PBT | 500 | DNF* |
| 10 | 2 × (Monolayer 1:1 $PC_1$/PBT) | 1000 | 40,000 |

*DNF is did not fail; tested for 1 million flex-life cycles.

Table 3 demonstrates the unique performance and unexpected advantages of laminated $PC_1$/PBT multilayer films, as compared to conventional monolayer laminated $PC_1$/PBT blends. Although the monolayer blends of $PC_1$/PBT (Sample 9) show improved flex-life as compared to the monolayer $PC_1$ films (Samples 1-3), the flex-life after a lamination step is reduced to a mere 40,000 cycles. By contrast, the 512 multilayer system maintains excellent flex-life (greater than 200,000 cycles) even with the inclusion of a lamination step. The flex-life test was stopped for Samples 7 and 8 after 200,000 cycles as no indication of failure was observed whatsoever.

Example 4

Samples 4-6 were subjected to Scanning Electron Microscopy (SEM). The samples were microtomed at room temperature and stained for 4 hours with ruthenium tetroxide. Images were taken on an ESEM XL30 at 10 kilovolts (kV), spot 4. The results are provided in FIGS. 4A-4C.

Samples 7-10 were subjected to Transmission Electron Microscopy (TEM). The samples were microtomed at room temperature and stained for 6.5 minutes with ruthenium tetroxide. Images were taken on a TEM Technai 12 at 100 kV, spot 1. The results are provided in FIGS. 5A-5D.

Figure 4A:
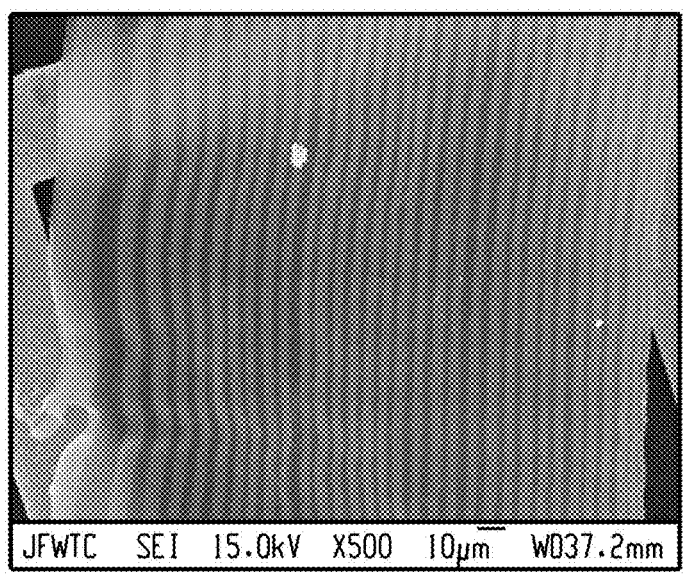
FIGS. 4A-4C are images obtained from a scanning electron microscope depicting multilayer substrates.
Figure 4B:
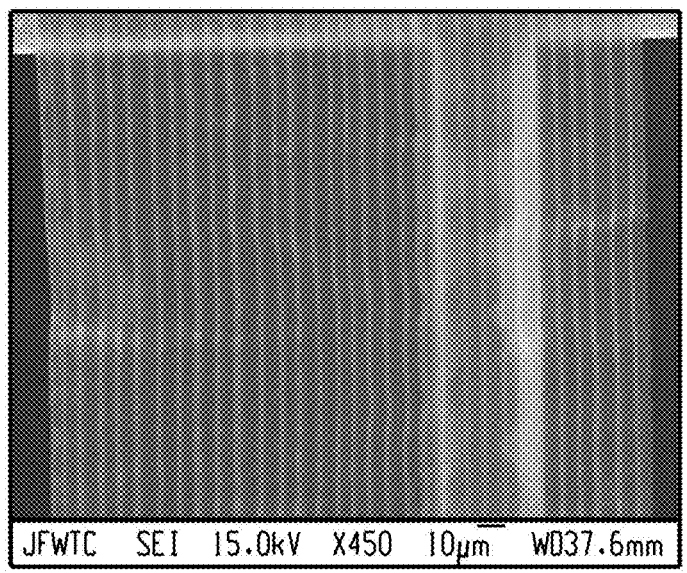
Figure 4C:
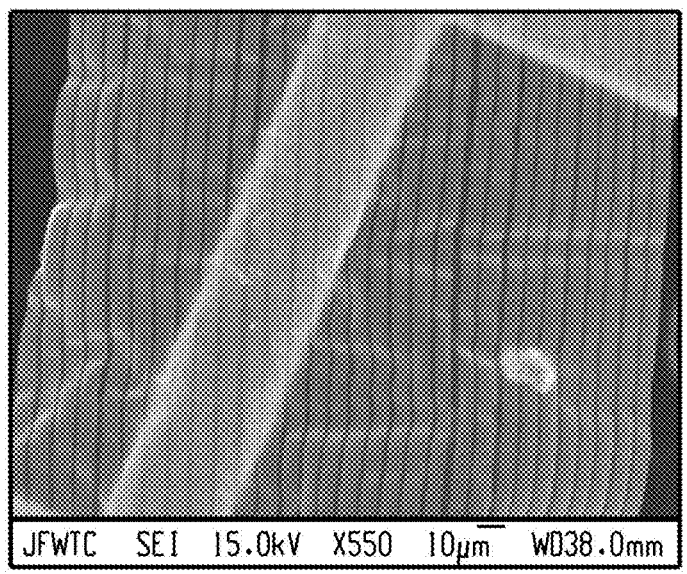
Figure 5A:
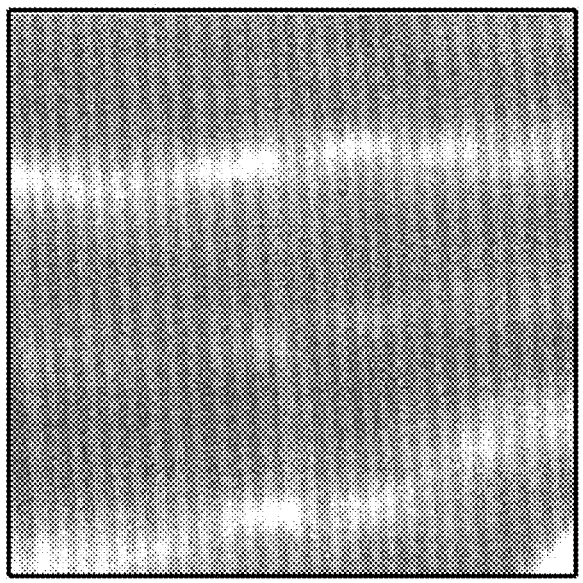
FIGS. 5A-5D are images obtained from a transmission electron microscope depicting multilayer substrates and comparative blended substrates.
Figure 5B:
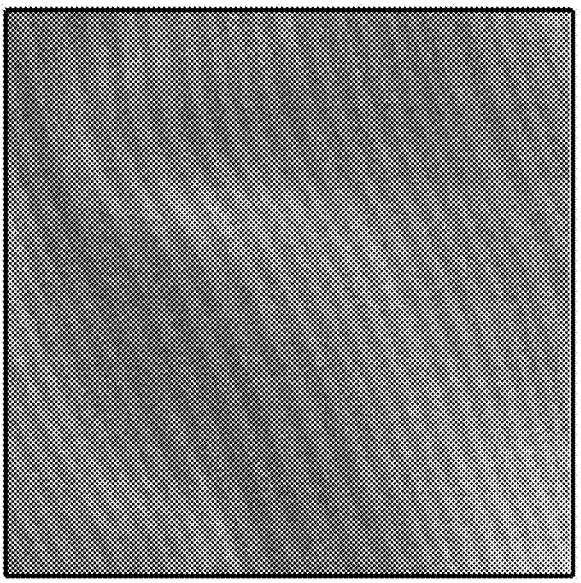
Figure 5C:
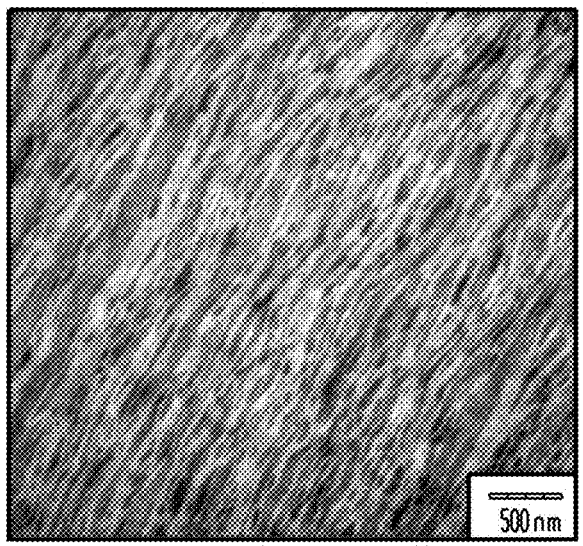
Figure 5D:
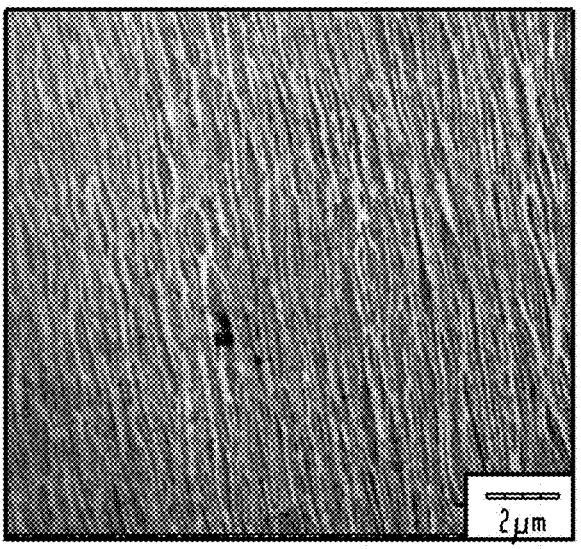

FIGS. 4A-4C (Samples 4-6) show a cross-section of multilayer film positioned on a copper grid, clearly depicting 64 alternating $PC_1$/PBT layers (PBT dark, $PC_1$ light). FIG. 5A (Sample 7) shows 512 alternating $PC_1$/PBT layers. FIG. 5B (Sample 8) demonstrates that even after intensive lamination, the multilayer structure remains intact. FIG. 5C (Sample 9; roll temperature of 60° C.) and FIG. 5D (Sample 10; laminated; roll temperature of 60° C.) show representative morphology images of the 1:1 $PC_1$/PBT conventional blend, exhibiting no distinct layers.

Example 5

Flex-life is influenced by the molar mass of the resin used. Accordingly, it is important to exclude molar mass differences in the samples studied. Table 4 shows the number-average (Mn) and weight-average (Mw) molar mass of PC and PBT in the extruded films. Table 4 demonstrates that there are no significant differences in the molar mass.

TABLE 4

| Sample | PC Mn (g/mol) | PC Mw (g/mol) | PBT Mn (g/mol) | PBT Mw (g/mol) |
|---|---|---|---|---|
| PBT |  |  | 36,900 | 110,100 |
| PC$_1$ | 8,200 | 18,000 |  |  |
| Sample 8 | 7,800 | 17,200 | 37,800 | 110,100 |
| Sample 9 | 8,300 | 18,300 | 38,900 | 113,000 |
| Sample 10 | 8,400 | 18,400 | 38,700 | 112,700 |

Example 6

Flex-life may also be influenced by the crystallinity of the resin used. Differential Scanning calorimetry (DSC) measurements were carried out from 20° C. to 300° C. with a heating and cooling rate of 20° C. per minute. The first heating and cooling curves were used to determine the maximum melting endotherm (Tm,max), heat of fusion (ΔH) in joules per gram (J/g), and crystallinity percentage (Xc). The results provided in Table 5 demonstrate that there are no significant differences in the crystalline structure.

TABLE 5

| Sample | Tm, max (° C.) | ΔH (J/g) | Xc |
|---|---|---|---|
| Sample 8 | 222.2 | 24.8 | 34 |
| Sample 9 | 221.9 | 28.0 | 39 |
| Sample 10 | 225.6 | 26.5 | 37 |

Example 7

Table 6 demonstrates how individual PC$_1$ and PBT layer thickness can affect flex-life performance Sample 16 (500 micrometer total thickness) comprises three layers; two outer PC$_1$ layer (50 micrometers each) and a central PBT layer (400 micrometers). Multilayer PC$_1$/PBT Sample 12 (also 500 micrometer total thickness) was prepared in accordance with the present disclosure. Multilayer Sample 12 exhibits significantly higher flex-life than Sample 16 despite both samples containing the same materials and having the same total thickness. Accordingly, Table 6 demonstrates that the unique multilayer approach results in significant and unexpected flex-life improvements.

TABLE 6

| Sample | Description | Thickness (micrometers) | Layer thickness | Flex-life Cycles |
|---|---|---|---|---|
| 11 | 64 multilayer 1:1 PC$_1$/PBT | 249 | 3.9 | DNF* |
| 12 | 512 multilayer 1:1 PC$_1$/PBT | 500 | 0.98 | DNF* |
| 13 | 64 multilayer 1:1 PC$_1$/PBT | 400 | 6.25 | DNF* |
| 14 | 64 multilayer 1:1 PC$_1$/PBT + 300 micrometer PC$_1$ layer | 600 | 4.69 | 85,000 |
| 15 | 64 multilayer 1:1 PC$_1$/PBT | 800 | 12.5 | 5,000 |
| 16 | PC$_1$/PBT/PC$_1$ | 500 | 50 PC 400 PBT | 400,000 |

TABLE 6-continued

| Sample | Description | Thickness (micrometers) | Layer thickness | Flex-life Cycles |
|---|---|---|---|---|
| 17 | 2 × (64 multilayer 1:1 PC$_1$/PBT) | 498 | 3.9 | 350,000 |

*DNF is did not fail; tested for 1 million flex-life cycles.

Example 8

Tear propagation resistance tests were conducted for the purposes of this example. The tests were performed in accordance with ASTM D1938 (1992). The results are an average of 10 tests; 5 each in the flow direction and the cross flow direction. The samples were a single-layer PC$_2$ extruded film, PBT extruded film, PET extruded film, a 64 and a 512 multilayer 1:1 PC$_2$/PBT extruded film, and a 64 and a 512 multilayer 1:1 PC$_2$/PET extruded film. All samples had a total thickness of 100 micrometers. Table 7 demonstrates a synergy between polycarbonate and PET. The PC/PET had a very high tear strength as compared to the other materials. The tear strength for the PC/PET was greater than 15N, and even up to 35 N.

TABLE 7

| Tear propagation data | |
|---|---|
| Material | Tear propagation strength [N] |
| PC$_2$ | 0.19 |
| PBT | 4.69 |
| PET | 3.60 |
| PC$_2$/PBT blend (1:1 weight ratio) | 2.61 |
| 64 multilayer 1:1 PC$_2$/PBT | 22.71 |
| 64 multilayer 1:1 PC$_2$/PET | 34.54 |
| 512 multilayer 1:1 PC$_2$/PBT | 9.59 |
| 512 multilayer 1:1 PC$_2$/PET | 31.65 |

Set forth below are some embodiments of the methods and articles disclosed herein.

Embodiment 1

A multilayer article, comprising: a multilayer substrate M, comprising: greater than or equal to 16 polymer A layers, preferably 16 to 512 polymer A layers; and greater than or equal to 16 polymer B layers, preferably 16 to 512 polymer B layers; wherein the polymer A layers and the polymer B layers are present in a ratio of 1:4 to 4:1, preferably the ratio is 1:1; a protective layer P; and an identification layer I between the protective layer P and the multilayer substrate M; wherein the identification layer I comprises information, and wherein the protective layer P prevents alteration thereof.

Embodiment 2

The article of Embodiment 1, further comprising a protective layer PP; and an identification layer II between the protective layer PP and the multilayer substrate M; wherein the identification layer II comprises information, and wherein the protective layer PP prevents alteration thereof.

Embodiment 3

The article of Embodiment 2, further comprising a multilayer substrate MM located between the multilayer substrate M and the identification layer II, wherein the multilayer B comprises: 16 to 512 polymer A layers; and 16 to 512 polymer B layers; wherein the polymer A layers and the polymer B layers are present in a ratio of 1:4 to 4:1, preferably the ratio is 1:1; a functional layer located between the multilayer substrate MM and the multilayer substrate M, wherein the functional layer comprises at least one of an RFID chip and an integrated circuit.

Embodiment 4

The article of any of the preceding Embodiments, wherein at least one of the identification layer I and the identification layer II is laser-engravable.

Embodiment 5

The article of any of the preceding Embodiments, wherein at least one of the protective layer P and the protective layer PP is a layer having a transmission of greater than or equal to 75%.

Embodiment 6

The article of any of the preceding Embodiments, wherein the multilayer identity article is a driver's license, national identification card, banking card, insurance card, security card, access card, badge, passport, or a combination comprising at least one of the foregoing.

Embodiment 7

The article of any of the preceding Embodiments, wherein at least one of polymer A and polymer B comprises an additive, and wherein the additive is spiropyran, spirooxazine, fulgide, diarylethene, spirodihydroindolizine, azo-compounds, and Schiff base family, benzo-family, naphthopyrans family, or a combination comprising at least one of the foregoing.

Embodiment 8

The article of any of the preceding Embodiments, wherein a flex-life of the multilayer identity article is greater than or equal to 400,000 cycles, preferably greater than or equal to 500,000 cycles, preferably greater than or equal to 600,000 cycles.

Embodiment 9

The article of any of the preceding Embodiments, wherein a thickness of an individual polymer A layer and/or a thickness of an individual polymer B layer is less than or equal to 10 micrometers.

Embodiment 10

The article of any of the preceding Embodiments, wherein a total thickness of at least one of the multilayer substrate M and the multilayer substrate MM is 200 micrometers to 2,000 micrometers, preferably 250 to 1,000 micrometers; preferably 300 to 800 micrometers.

Embodiment 11

The article of any of the preceding Embodiments, wherein the polymer A layers and the polymer B layers overlap in an alternating manner.

Embodiment 12

The article of any of the preceding Embodiments, wherein the article comprises two or more multilayer substrates.

Embodiment 13

The article of any of the preceding Embodiments, wherein the polymer A layers comprise at least one of polycarbonate, polyimide, polyarylate, polysulphone, polymethylmethacrylate, polyvinylchloride, acrylonitrile butadiene styrene, and polystyrene; preferably polymer A layers comprise polycarbonate; preferably polymer A layers comprise a polycarbonate copolymer.

Embodiment 14

The article of any of the preceding Embodiments, wherein the polymer B layers comprise at least one of polybutylene terephthalate, polyethylene terephthalate, polyetheretherketone, polytetrafluoroethylene, polyamide, polyphenylene sulphide, polyoxymethylene, and polypropylene; preferably wherein the polymer B layers comprise at least one of polybutylene terephthalate and polyethylene terephthalate; preferably wherein the polymer B layers comprise polyethylene terephthalate.

Embodiment 15

The article of any of the preceding Embodiments, wherein at least one of polymer A and polymer B comprises an additive comprises an additive comprising at least one of ultraviolet absorbing additive selected from hydroxybenzophenones, hydroxybenzotriazoles, hydroxybenzotriazines, cyanoacrylates, oxanilides, benzoxazinones, benzylidene malonates, hindered amine light stabilizers, nano-scale inorganics, and combinations comprising at least one of the foregoing.

Embodiment 16

The article of any of the preceding Embodiments, wherein at least one of polymer A and polymer B comprises an additive, and wherein the active component has ester groups of the formula

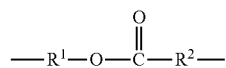

wherein at least 60 percent of the total number of $R^1$ groups contain aromatic moieties and the balance thereof are aliphatic, alicyclic, or aromatic, and $R^2$ groups can be oxygen, aliphatic, alicyclic, or aromatic, or contain aromatic moieties with the balance thereof being aliphatic, alicyclic, or aromatic.

Embodiment 17

The article of Embodiment 16, wherein at least one of polymer A and polymer B comprises an additive, and wherein the active component is a carbonate group, $R^2$ is oxygen derived.

Embodiment 18

The article of any of the preceding Embodiments, wherein at least one of polymer A and polymer B comprises an additive, and wherein the additive comprises at least one of a photoactive additive and a taggant.

Embodiment 19

The article of Embodiment 18, wherein the taggant comprises at least one of phosphors taggant material and nitride taggant material; preferably comprises yttrium oxysulfide.

Embodiment 20

The article of any of the preceding Embodiments, wherein the polymer A layers comprises a copolymer of polycarbonate and sebacic acid.

Embodiment 21

A method of making a multilayer identity article, comprising: forming a multilayer substrate M, wherein the multilayer substrate M is formed either by: i) co-extruding two or more feed streams in an overlapping manner forming a composite layer stream, wherein the feed streams comprise an polymer A stream and a polymer B stream, wherein polymer A has a different composition than polymer B; processing the composite layer stream in an extrusion cycle comprising: splitting the composite layer stream into sub-streams, wherein each of the sub-streams has a portion of each layer of the composite layer stream; repositioning the sub-streams in an overlapping manner such that the sub-streams are aligned with one another; and contacting the sub-streams with each other to form a subsequent composite layer stream; repeating the extrusion cycle until a total number of substrate layers is achieved, wherein the total number of substrate layers is represented by $X(Y^N)$, wherein X represents the number of feed streams, Y represents the number of sub-streams, and N represents a number of times the extrusion cycle is repeated; or ii) by splitting the polymer stream A into N different A streams and polymer stream B into either N−1, N, or N+1 B streams, and recombining the A and B streams, alternating between the A stream and the B stream; and disposing an identification layer I between a protective layer P and the multilayer substrate, wherein the identification layer I comprises information, and wherein the protective layer P prevents alteration thereof.

Embodiment 22

The method of Embodiment 21, wherein the total number of substrate layers is 32 to 1024, preferably 64 to 512; and preferably wherein the overall thickness of the substrate is less than or equal to 4 mm, preferably less than or equal to 2 mm, or less than or equal to 1 mm.

Embodiment 23

The method of any of Embodiments 21-22, wherein a flex-life of the multilayer identity card is greater than or equal to 400,000 cycles, preferably greater than or equal to 500,000 cycles, preferably greater than or equal to 600,000 cycles.

Embodiment 24

The method of any of Embodiments 21-23, further comprising disposing an identification layer II between a protective layer PP and the multilayer substrate M, wherein the identification layer II comprises information, and wherein the protective layer PP prevents alteration thereof.

Embodiment 25

The method of any of Embodiments 21-24, further comprising forming a multilayer substrate MM, wherein the multilayer substrate MM is formed by: co-extruding two or more feed streams in an overlapping manner forming a composite layer stream, wherein the feed streams comprise an polymer A stream and a polymer B stream; processing the composite layer stream in an extrusion cycle comprising: splitting the composite layer stream into sub-streams, wherein each of the sub-streams has a portion of each layer of the composite layer stream; repositioning the sub-streams in an overlapping manner such that the sub-streams are aligned with one another; contacting the sub-streams with each other to form a subsequent composite layer stream; repeating the extrusion cycle until a total number of substrate layers is achieved, wherein the total number of substrate layers is represented by $X(Y^N)$, wherein X represents the number of feed streams, Y represents the number of sub-streams, and N represents a number of times the extrusion cycle is repeated; and disposing the multilayer substrate MM between the multilayer substrate M and the identification layer II; disposing a functional layer between the multilayer substrate MM and the multilayer substrate M; wherein the functional layer comprises at least one of an RFID chip and an integrated circuit.

Embodiment 26

The method of Embodiments 21-25, wherein the polymer A layers comprises a copolymer of polycarbonate and sebacic acid.

Embodiment 27

The article of any of Embodiments 21-26, wherein at least one of polymer A and polymer B comprises an additive comprising at least one of ultraviolet absorbing additive selected from hydroxybenzophenones, hydroxybenzotriazoles, hydroxybenzotriazines, cyanoacrylates, oxanilides, benzoxazinones, benzylidene malonates, hindered amine light stabilizers, nano-scale inorganics, and combinations comprising at least one of the foregoing.

Embodiment 28

The article of any of Embodiments 21-27, wherein the active component has ester groups of the formula

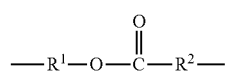

wherein at least 60 percent of the total number of $R^1$ groups contain aromatic moieties and the balance thereof are aliphatic, alicyclic, or aromatic, and $R^2$ groups can be oxygen, aliphatic, alicyclic, or aromatic, or contain aromatic moieties with the balance thereof being aliphatic, alicyclic, or aromatic.

Embodiment 29

The article of Embodiment 28, wherein the active component is a carbonate group, $R^2$ is oxygen derived.

Embodiment 30

The article of any of Embodiments 21-29, wherein at least one of polymer A and polymer B comprises an additive, wherein the additive comprises at least one of a photoactive additive and a taggant.

Embodiment 31

The article of any of Embodiments 21-30, wherein at least one of polymer A and polymer B comprises an additive, wherein the additive is spiropyran, spirooxazine, fulgide, diarylethene, spirodihydroindolizine, azo-compounds, and Schiff base family, benzo-family, naphthopyrans family, or a combination comprising at least one of the foregoing.

Embodiment 32

An article formed by the method of any of Embodiments 21-31.

In general, the invention may alternately comprise, consist of, or consist essentially of, any appropriate components herein disclosed. The invention may additionally, or alternatively, be formulated so as to be devoid, or substantially free, of any components, materials, ingredients, adjuvants or species used in the prior art compositions or that are otherwise not necessary to the achievement of the function and/or objectives of the present invention. The endpoints of all ranges directed to the same component or property are inclusive and independently combinable (e.g., ranges of "less than or equal to 25 wt %, or 5 wt % to 21 wt %," is inclusive of the endpoints and all intermediate values of the ranges of "5 wt % to 25 wt %," etc.). Disclosure of a narrower range or more specific group in addition to a broader range is not a disclaimer of the broader range or larger group. "Combination" is inclusive of blends, mixtures, alloys, reaction products, and the like. Furthermore, the terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. "Or" means "and/or." The identifiers "A", "B", "I", "II", "M", "MM", "P", "PP" are merely labels used to distinguish one element from another element; enabling proper antecedent basis and clarity. They are merely for clarity. The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

Photochromism, as used herein, can be defined as a reversible transformation of a chemical species (A and B), induced in one or both directions by electromagnetic radiation.

"Optional" or "optionally" means that the subsequently described event or circumstance can or cannot occur, and that the description includes instances where the event occurs and instances where it does not. Unless defined otherwise, technical and scientific terms used herein have the same meaning as is commonly understood by one of skill in the art to which this invention belongs.

All cited patents, patent applications, and other references are incorporated herein by reference in their entirety. However, if a term in the present application contradicts or conflicts with a term in the incorporated reference, the term from the present application takes precedence over the conflicting term from the incorporated reference. Application U.S. Ser. No. 62/365,045 filed on Jul. 21, 2016, is incorporated herein in its entirety While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A multilayer identity article (10, 20), comprising:
a first multilayer substrate (12, 12b), comprising:
greater than or equal to 16 layers comprising a first polymer; and
greater than or equal to 16 layers comprising a second polymer;
wherein the layers of the first polymer and the layers of the second polymer are present in a ratio of 1:4 to 4:1;
a first protective layer (16, 16b); and
a first identification layer (14) between the first protective layer (16, 16b) and the first multilayer substrate (12, 12b);
wherein the first identification layer (14) comprises information, and wherein the first protective layer (16, 16b) prevents alteration thereof; and
wherein the layers of the first polymer comprise at least one of polycarbonate, polyimide, polyarylate, polysulphone, polymethylmethacrylate, polyvinylchloride, acrylonitrile butadiene styrene, or polystyrene;
wherein the layers of the second polymer comprise at least one of polybutylene terephthalate, polyethylene terephthalate, polyetheretherketone, polytetrafluoroethylene, polyamide, polyphenylene sulphide, polyoxymethylene, or polypropylene; and the first polymer has a different composition than the second polymer;
wherein the layers of the first polymer and the layers of the second polymer overlap in an alternating manner; and
wherein a thickness of each individual layer comprising the first polymer and a thickness of each individual layer comprising the second polymer is less than or equal to 10 micrometers.

2. The article of claim 1, further comprising
a second protective layer (16, 16a); and
a second identification layer (14) between the second protective layer (16, 16a) and the first multilayer substrate (12, 12b);
wherein the second identification layer (14) comprises information, and wherein the second protective layer (16, 16a) prevents alteration thereof.

3. The article of claim 2, further comprising
a second multilayer substrate (12a) located between the first multilayer substrate (12b) and the second identification layer (14), wherein the second multilayer substrate (12a) comprises:
16 to 512 layers of the first polymer; and
16 to 512 layers of the second polymer;
wherein the layers of the first polymer and the layers of the second polymer are present in a ratio of 1:4 to 4:1;
a functional layer (22) located between the second multilayer substrate (12a) and the first multilayer substrate (12b), wherein the functional layer (22) comprises at least one of an RFID chip and an integrated circuit.

4. The article of claim 1, wherein at least one of the first identification layer (14) and the second identification layer (14) is laser-engravable, and/or wherein at least one of the first protective layer (16, 16b) and the second protective layer (16, 16a) is a layer having a transmission of greater than or equal to 75%.

5. The article of claim 1, wherein the multilayer identity article (10, 20) is a driver's license, national identification card, banking card, insurance card, security card, access card, badge, passport, or a combination comprising at least one of the foregoing.

6. The article of claim 1, wherein a flex-life of the multilayer identity article (10, 20) is greater than or equal to 400,000 cycles.

7. The article of claim 1, wherein a thickness of each individual layer comprising the first polymer and a thickness of each individual layer comprising the second polymer is from 1 to 10 micrometers.

8. The article of claim 3, wherein a total thickness of at least one of the first multilayer substrate (12, 12b) and the second multilayer substrate (12a) is 200 micrometers to 2,000 micrometers.

9. The article of claim 1, wherein the article (10, 20) comprises two or more multilayer substrates (12, 12a, 12b).

10. The article of claim 1, wherein the layers of the first polymer comprise polycarbonate.

11. The article of claim 1 wherein the layers of the first polymer, the layers of the second polymer or both comprise a photoactive additive.

12. The article of claim 1 wherein the layers comprising the first polymer, the layers comprising the second polymer or both, further comprise hydroxybenzophenones, hydroxybenzotriazoles, hydroxybenzotriazines, cyanoacrylates, oxanilides, benzoxazinones, benzylidene malonates, hindered amine light stabilizers, nano-scale inorganics, and combinations thereof.

13. The article of claim 1 wherein the layers comprising the first polymer, the layers comprising the second polymer or both, further comprise spiropyran, spirooxazine, fulgide, diarylethene, spirodihydroindolizine, azo-compounds, and Schiff base, benzo- and naphthopyrans families, and combinations comprising at least one of the foregoing.

14. The article of claim 1 wherein the layers comprising the first polymer, the layers comprising the second polymer or both, further comprise a taggant.

15. The article of claim 1 wherein the first polymer comprises a polycarbonate resin and the second polymer comprises polyethyeleneterephthalate or polybutyleneterephthalate.

16. The article of claim 15 wherein the multilayer substrate consists essentially of at least 32 layers comprising the first polymer and at least 32 layers comprising the second polymer.

17. A method of making the multilayer identity article (10, 20) of claim 1, comprising:
forming a first multilayer substrate (12, 12b), wherein the first multilayer substrate (12, 12b) is formed by
co-extruding two or more feed streams (30, 32) in an overlapping manner forming a composite layer stream (34), wherein the feed streams (30, 32) comprise a stream comprising a first polymer (30) and optionally an additive and a stream comprising a second polymer (32) and optionally an additive, wherein the first polymer has a different composition than the second polymer;
processing the composite layer stream (34) in an extrusion cycle comprising:
splitting the composite layer stream (34) into sub-streams (24), wherein each of the sub-streams (24) has a portion of each layer of the composite layer stream (34);
repositioning the sub-streams (24) in an overlapping manner such that the sub-streams (24) are aligned with one another; and
contacting the sub-streams (24) with each other to form a subsequent composite layer stream (42);
repeating the extrusion cycle until a total number of substrate layers is achieved, wherein the total number of substrate layers is represented by $X(Y^N)$, wherein X represents the number of feed streams, Y represents the number of sub-streams, and N represents a number of times the extrusion cycle is repeated, and wherein the total number of substrate layers is at least 32; and
disposing a first identification layer (14) between a first protective layer (16, 16b) and the first multilayer substrate (12, 12b), wherein the first identification layer (14) comprises information, and wherein the first protective layer (16, 16b) prevents alteration thereof.

18. The method of claim 17, wherein the total number of substrate layers is 64 to 1024 and/or wherein the overall thickness of the substrate (12, 12b) is less than or equal to 4 mm and each substrate has a thickness no greater than 10 micrometers.

19. The method of claim 17, further comprising disposing a second identification layer (14) between a second protective layer (16, 16a) and the first multilayer substrate (12, 12b), wherein the second identification layer (14) comprises information, and wherein the second protective layer (16, 16a) prevents alteration thereof.

20. The method of claim 17, further comprising forming a second multilayer substrate (12a), wherein the second multilayer substrate (12a) is formed either by
i) co-extruding two or more feed streams (30, 32) in an overlapping manner forming a composite layer stream (34), wherein the feed streams (30, 32) comprise a stream of the first polymer (30) and a stream of the second polymer (32);
processing the composite layer stream (34) in an extrusion cycle comprising:

splitting the composite layer stream (34) into sub-streams (24), wherein each of the sub-streams (24) has a portion of each layer of the composite layer stream (34);
repositioning the sub-streams (24) in an overlapping manner such that the sub-streams (24) are aligned with one another; and
contacting the sub-streams (24) with each other to form a subsequent composite layer stream (42); or
repeating the extrusion cycle until a total number of substrate layers is achieved, wherein the total number of substrate layers is represented by $X(Y^N)$, wherein X represents the number of feed streams, Y represents the number of sub-streams, and N represents a number of times the extrusion cycle is repeated; or
ii) by splitting the stream of the first polymer (30) into N different streams of the first polymer and the stream of the second polymer (32) into either N−1, N, or N+1 streams of the second polymer, and recombining the streams of the first and second polymer (30, 32), alternating between the stream of the first polymer (30) and the stream of the second polymer (32); and
disposing the second multilayer substrate (12*a*) between the first multilayer substrate (12*b*) and the second identification layer (14);
disposing a functional layer (22) between the second multilayer substrate (12*a*) and the first multilayer substrate (12*b*);
wherein the functional layer (22) comprises at least one of an RFID chip and an integrated circuit.

\* \* \* \* \*